UNITED STATES PATENT OFFICE.

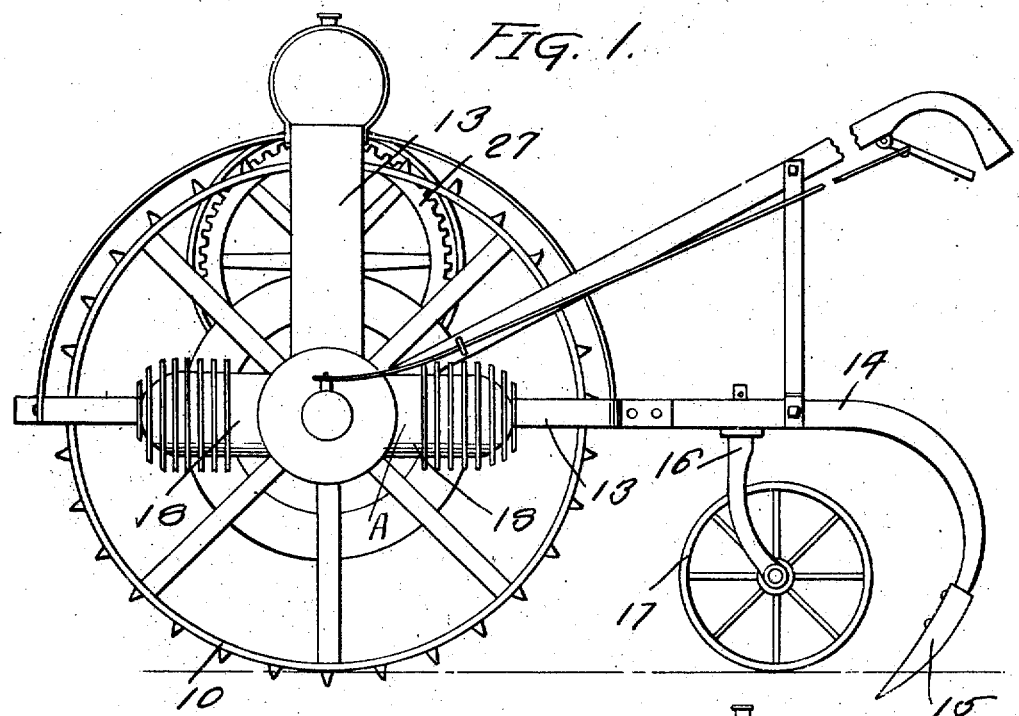
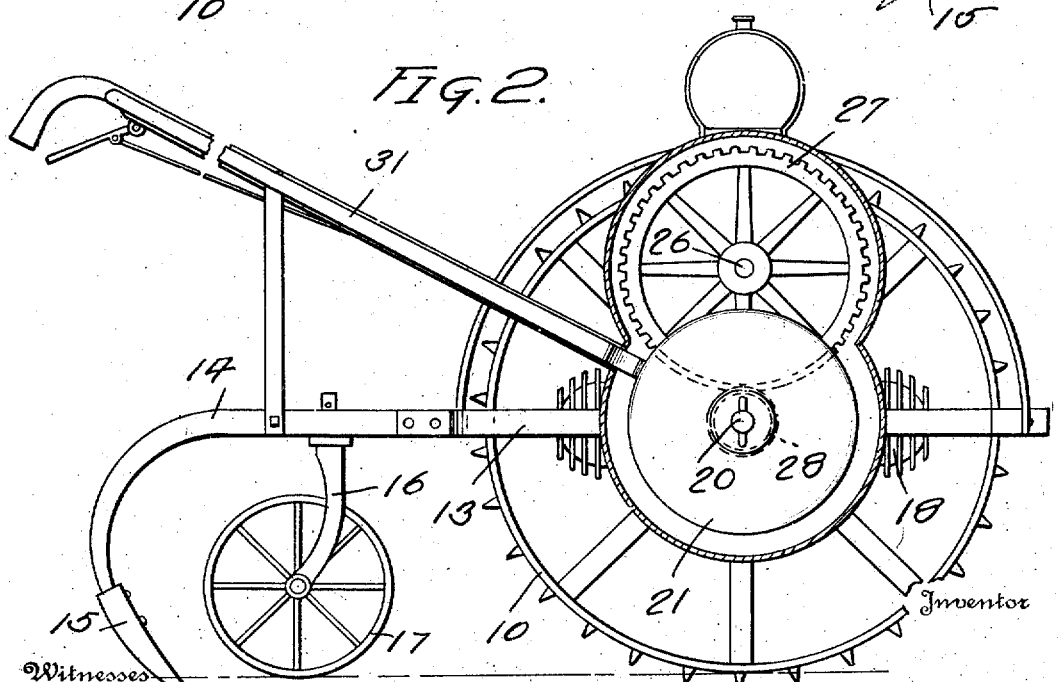

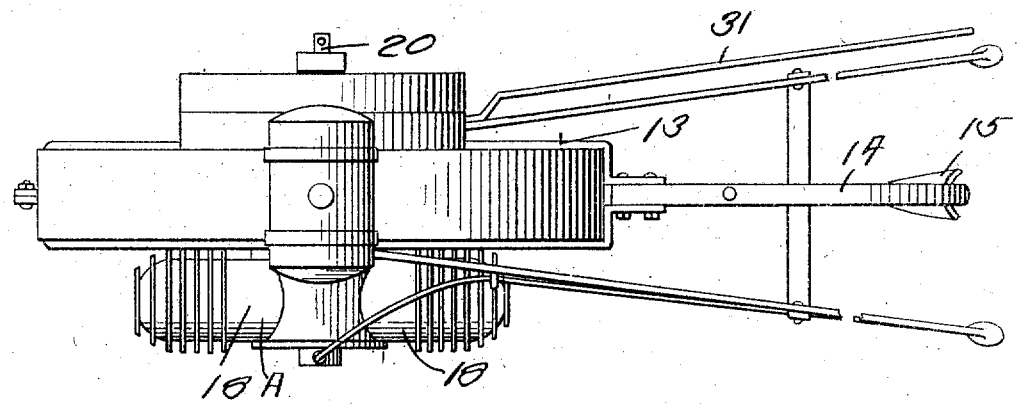
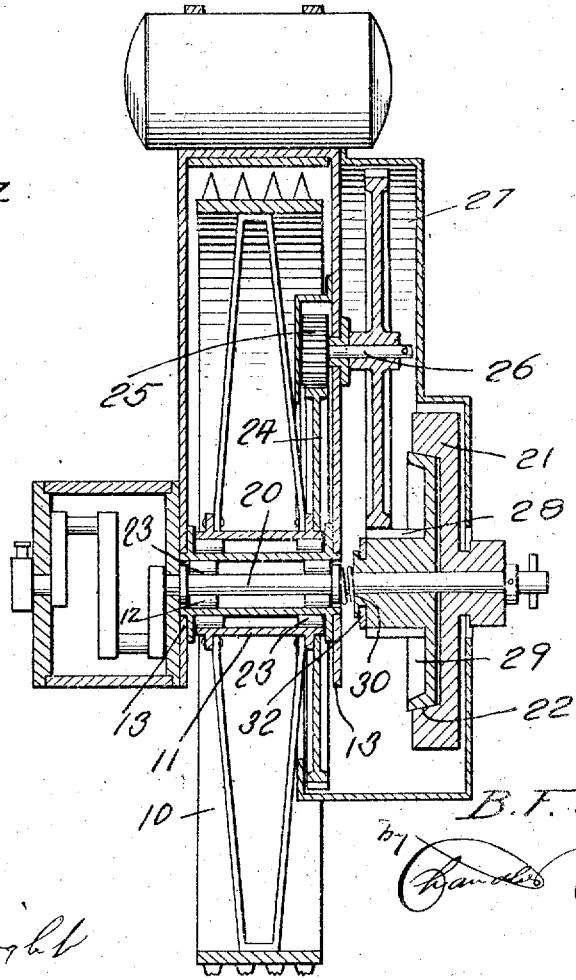

BENJAMIN F. GRAVELY, JR., OF CHARLESTON, WEST VIRGINIA.

MOTOR-PLOW.

1,207,539.

Specification of Letters Patent.

Patented Dec. 5, 1916.

Application filed September 8, 1915. Serial No. 49,574.

*To all whom it may concern:*

Be it known that I, BENJAMIN F. GRAVELY, Jr., a citizen of the United States, residing at Charleston, in the county of Kanawha, State of West Virginia, have invented certain new and useful Improvements in Motor-Plows; and I do hereby declare the following to be a full, clear, and exact description of the invention, such as will enable others skilled in the art to which it appertains to make and use the same.

This invention relates to motor plows.

The object of the invention is to provide a motor plow of the type employing but a single traction wheel and in which the motor is so arranged that the plow will be properly balanced when passing over the ground.

A further object of the invention is to provide a motor plow of the type named which will embody comparatively few parts, will be simple in construction, efficient in use and which can be manufactured at a comparatively small cost.

With the above and other objects in view the invention consists in the details of construction and in the arrangement and combination of parts to be hereinafter more fully described and particularly pointed out in the apppended claim.

In describing the invention in detail reference will be had to the accompanying drawings wherein like characters of reference denote corresponding parts in the several views, and in which—

Figure 1 is a side elevation of a motor plow constructed in accordance with the invention; Fig. 2, a view similar to Fig. 1 looking at the opposite side of the plow; Fig. 3, a plan view of the plow, and Fig. 4, a horizontal section of the plow.

Referring to the drawings the improved plow is shown as comprising a traction wheel 10 which is rotatably mounted upon a tubular axle 11, roller bearings 12 being interposed between the hub of the wheel 10 and the axle 11. Fixed upon the axle 11 is a frame 13 and secured to this frame is a beam 14 carrying a plow 15. It will be noted that the number of beams 14 and plows 15 may be varied if desired. Each of the beams 14 carries a bracket 16 in which is rotatably mounted a ground wheel 17. Mounted upon the frame 13 at one side thereof is a motor A of the explosive type and including cylinders 18 and 19 disposed diametrically opposite with respect to the shaft or axle 11 whereby the plow will be properly balanced. The motor A includes a crank shaft 20 which extends through the bore of the axle 11 and has fixed on the end thereof remote from the cylinders 18 and 19 a fly wheel 21 having a beveled clutch face 22. The crank shaft 20 is held in spaced relation to the interior wall of the axle 11 by means of roller bearings 23. Fixed on the wheel 10 is a gear 24 which meshes with a gear 25 fixed on a shaft 26 rotatably mounted in the frame 13. Also fixed on the shaft 26 is a gear 27 which meshes with a gear 28 loosely mounted on the crank shaft 20. This gear 28 has fixed thereto a friction clutch 29 adapted to coöperate with the clutch face 22 on the fly wheel 21 for the purpose of connecting the gear 28 with the crank shaft 20. The clutch 29 is normally held in clutching position by means of a spring 30 one end of which bears against a ball bearing collar on the shaft 20 and the other end against the gear 28. The clutch 29 is adapted to be moved out of clutching position against the influence of the spring 30 by means of a lever 31 pivoted on the frame 13 and secured to a yoke 32 rotatably disposed upon the gear 28 but held against movement longitudinally of said gear.

Assuming that the clutch 29 is thrown in it will be apparent that upon actuation of the motor A the crank shaft 20 will be rotated and this rotation will be transmitted to the wheel 10 through the medium of the gears 28, 27, 25 and 24.

What is claimed is:—

In a motor plow, the combination of a tubular axle, a traction wheel rotatably mounted on the axle, a frame fixed on the axle, an explosive motor mounted on the frame and including a pair of cylinders disposed diametrically opposite with respect to the longitudinal axis of the axle, a crank shaft in said motor and extending through the bore of said axle, and connections between said crank shaft and the traction wheel for rotating the latter, said connections being disposed on the opposite side of the frame from the motor.

In testimony whereof, I affix my signature, in the presence of two witnesses.

BENJAMIN F. GRAVELY, Jr.

Witnesses:
U. G. Young,
H. H. McCann.